(12) United States Patent
Watanabe et al.

(10) Patent No.: US 9,013,150 B2
(45) Date of Patent: Apr. 21, 2015

(54) POWER SUPPLY DEVICE

(75) Inventors: Kazunori Watanabe, Shinga (JP); Koji Asakawa, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 384 days.

(21) Appl. No.: 13/560,108

(22) Filed: Jul. 27, 2012

(65) Prior Publication Data

US 2013/0063095 A1 Mar. 14, 2013

(30) Foreign Application Priority Data

Sep. 13, 2011 (JP) ................................. 2011-199006

(51) Int. Cl.
*H02J 7/00* (2006.01)
*H02J 7/04* (2006.01)

(52) U.S. Cl.
CPC ............. *H02J 7/0078* (2013.01); *H02J 7/0081* (2013.01); *H02J 7/044* (2013.01); *H02J 7/045* (2013.01)

(58) Field of Classification Search
USPC .......................................................... 320/124
See application file for complete search history.

(56) References Cited

U.S. PATENT DOCUMENTS

| 5,514,946 | A | * | 5/1996 | Lin et al. ........................... 702/63 |
| 6,075,340 | A | | 6/2000 | Koenck |
| 7,391,183 | B2 | * | 6/2008 | Ariga et al. .................... 320/125 |
| 2002/0000788 | A1 | * | 1/2002 | Ostergaard et al. ........... 320/128 |
| 2007/0075678 | A1 | | 4/2007 | Ng et al. |

FOREIGN PATENT DOCUMENTS

| JP | 64-60231 | 3/1989 |
| JP | 4-127075 | 4/1992 |
| JP | 7-143687 | 6/1995 |
| JP | 2807793 | 7/1998 |
| JP | 2002-311114 | 10/2002 |
| JP | 3457681 | 8/2003 |
| JP | 2005-278371 | 10/2005 |

(Continued)

OTHER PUBLICATIONS

Extended European Search Report from European Patent Office (E.P. O.), dated Feb. 4, 2013, for corresponding European Application No. 12177563.9.

(Continued)

*Primary Examiner* — Paul Dinh
*Assistant Examiner* — Bryce Aisaka
(74) *Attorney, Agent, or Firm* — Greenblum & Bernstein, P.L.C.

(57) ABSTRACT

Provided is a power supply device integrally combined with an electrical device body including a motor, comprising a rechargeable battery for supplying power to the motor, a microcomputer for detecting a residual capacity and a battery voltage of the battery, and a switching element provided between the battery and the microcomputer. The microcomputer stops charging the battery when the detected residual capacity has become 100%, and when the detected value of the battery voltage has become lower than a peak value after the value of the battery voltage passes the peak value, making it possible to prevent overcharging of the battery. The microcomputer also controls to turn off the switching element to stop the power supply from the battery to the microcomputer when the residual capacity becomes less than a predetermined threshold value, making it possible to reduce power consumption.

6 Claims, 9 Drawing Sheets

(56) References Cited

FOREIGN PATENT DOCUMENTS

| JP | 2009-199774 | 9/2009 |
|---|---|---|
| WO | 94/05068 | 3/1994 |

OTHER PUBLICATIONS

Japanese Office Action, mailed Dec. 24, 2014, by the Japan Patent Office for corresponding Japanese Application No. 2011-199006.

* cited by examiner

SPECIFIC BATTERY VOLTAGE
CONDITION IS SATISFIED
(5 MINUTES AFTER START OF
CHARGING OR THEREAFTER)

*WITH RESIDUAL CAPACITY DETECTION FUNCTION

POWER SUPPLY DEVICE

BACKGROUND OF THE INVENTION

1. Field of the Invention

The present invention relates to a power supply device comprising a rechargeable battery for supplying power to a load of a motor, a lamp or the like.

2. Description of the Related Art

In a power supply device comprising a rechargeable battery for supplying power to a load of a motor, a lamp or the like, it is necessary to prevent overcharging of the rechargeable battery so as to prevent overheating and explosion of the battery. Thus, conventionally, a microcomputer in many such power supply devices is provided with a function to detect a residual capacity of the rechargeable battery (residual capacity detection function) so as to stop (end) charging the rechargeable battery when the microcomputer detects that the residual capacity has become 100% (full charge). However, in the full charge detection method using the residual capacity detection function, it is required to continuously operate the microcomputer to control at least the amount of charged current to the rechargeable battery and the amount of discharged current from the rechargeable battery to the load, resulting in the problem of power consumption in the microcomputer. Japanese Laid-open Patent Publications No. 2005-278371 and No. Hei 7-143687 disclose power supply devices of this kind with a residual capacity detection function.

On the other hand, a nickel metal hydride rechargeable battery has a characteristic such that the moment when it reaches a state of full charge is a moment when the value of the battery voltage becomes slightly lower than a peak value after (reaching and) passing the peak value. More specifically, the nickel metal hydride rechargeable battery has a charge characteristic (hereafter referred to as a first charge characteristic) that if the charging is started when the nickel metal hydride rechargeable battery has a residual capacity less than a certain threshold value, it reaches a state of full charge when the value of the battery voltage has become slightly lower than the peak value after the value of the battery voltage passes the peak value. Thus, there has been an increase in the number of power supply devices, comprising a nickel metal hydride rechargeable battery and using the first charge characteristic, that determine that the battery has reached a state of full charge when the value of the battery voltage has become slightly lower than the peak value after passing the peak value, so as to stop charging the nickel metal hydride rechargeable battery. Such power supply devices, in contrast to the power supply devices with the residual capacity detection function described above, do not make it necessary to continuously operate the microcomputer to control the amount of charged current and the amount of discharged current, making it possible to reduce power consumption.

BRIEF SUMMARY OF THE INVENTION

However, these conventional power supply devices have problems as described below. FIG. 8 is a graph showing variation with time of battery capacity in a conventional power supply device without a residual capacity detection function, for explaining the problem of overcharging. As shown in FIG. 8, if the charging of a nickel metal hydride rechargeable battery of the power supply device without the residual capacity detection function is started when the residual capacity is only slightly reduced (for example when the residual capacity is 90% or more), the battery may reach a state of full charge before the value of the battery voltage shows a peak value. More specifically, the nickel metal hydride rechargeable battery has a charge characteristic (hereafter referred to as a second charge characteristic) that if the charging is started when the residual capacity is equal to a certain threshold value or more, it reaches a state of full charge before the value of the battery voltage shows a peak value. Thus, the method of detecting the peak value of the battery voltage to detect a state of full charge as described above cannot detect that the battery has reached the state of full charge if the charging is started when the residual capacity is only slightly reduced as shown in FIG. 8, which may cause overcharging.

On the other hand, FIG. 9 is a graph showing variation with time of battery capacity in a conventional power supply device with a residual capacity detection function, for explaining how it prevents overcharging. As shown in FIG. 9, according to the power supply device with the residual capacity detection function, it is possible to accurately detect that the battery has reached a state of full charge, so that overcharging can be prevented. However, the power supply device with the residual capacity detection function is required to continuously operate the microcomputer, resulting in the problem of power consumption in the microcomputer as described above.

An object of the present invention is to provide a power supply device which comprises a rechargeable battery having both the first and second charge characteristics, and can prevent overcharging and at the same time reduce power consumption of the rechargeable battery.

According to the present invention, this object is achieved by a power supply device integrally combined with an electrical device body including a load, the power supply device comprising: a rechargeable battery for supplying power to the load; charge terminals electrically connected to the rechargeable battery; residual capacity detecting means supplied with power from the rechargeable battery for operation to detect a residual capacity of the rechargeable battery based on an amount of charged current to the rechargeable battery and an amount of discharged current from the rechargeable battery to the load; a switching element provided between the rechargeable battery and the residual capacity detecting means; battery voltage detecting means for detecting a value of battery voltage of the rechargeable battery; charge control means for stopping charging the rechargeable battery when the residual capacity detected by the residual capacity detecting means has become 100%, and when the value of the battery voltage detected by the battery voltage detecting means has become a value lower than a peak value after the value of the battery voltage passes the peak value; and power supply stop control means for controlling to turn off the switching element to stop the power supply from the rechargeable battery to the residual capacity detecting means when the residual capacity detected by the residual capacity detecting means becomes less than a predetermined threshold value.

The rechargeable battery has: a charge characteristic that if charging of the rechargeable battery is started when the rechargeable battery has a residual capacity less than the predetermined threshold value, the rechargeable battery reaches a state of full charge when the value of the battery voltage of the rechargeable battery has become a value lower than a peak value after the value of the battery voltage passes the peak value; and a charge characteristic that if the charging of the rechargeable battery is started when the rechargeable battery has a residual capacity equal to the predetermined threshold value or more, the rechargeable battery reaches the state of full charge before the value of the battery voltage of the rechargeable battery shows the peak value.

According to the power supply device of the present invention, when the residual capacity of the rechargeable battery becomes less than a predetermined threshold value, the switching element is turned off to stop power supply from the rechargeable battery to the residual capacity detecting means. This makes it possible to reduce power consumption. Further, even if the power supply to the residual capacity detecting means is stopped, the rechargeable battery reaches a state of full charge when the value of the battery voltage has become a value lower than a peak value after the value of the battery voltage passes the peak value, if the charging of the rechargeable battery is started when the rechargeable battery has a residual capacity less than the predetermined threshold value. Further, when the value of the battery voltage of the rechargeable battery becomes a value lower than the peak value after the value of the battery voltage passes the peak value (i.e. when the rechargeable battery reaches the state of full charge), the charge control means stops charging the rechargeable battery. Thus, overcharging of the rechargeable battery can be prevented when the charging of the rechargeable battery is started with a residual capacity less than the predetermined threshold value.

On the other hand, when the residual capacity of the rechargeable battery is equal to the predetermined threshold value or more, the power supply from the rechargeable battery to the residual capacity detecting means is not stopped (to allow the residual capacity detecting means to remain operative to detect the residual capacity). Thus, if the charging of the rechargeable battery is started when the residual capacity of the rechargeable battery is equal to the predetermined threshold value or more, the charge control means stops charging the rechargeable battery when the residual capacity of the rechargeable battery has become 100% (state of full charge) and before the value of the battery voltage of the rechargeable battery shows the peak value. This makes it possible to prevent overcharging of the rechargeable battery even if the charging of the rechargeable battery is started when the residual capacity of the rechargeable battery is equal to the predetermined threshold value or more.

The power supply device of the present invention can further comprise charge current detecting means for detecting a value of the charge current to the rechargeable battery and discharge current detecting means for detecting a value of the discharge current discharged from the rechargeable battery to the load. The residual capacity detecting means uses the value of the charge current detected by the charge current detecting means to calculate the amount of charged current to the rechargeable battery, and uses the value of the discharge current detected by the discharge current detecting means to calculate the amount of discharged current from the rechargeable battery to the load.

Further, the rechargeable battery to be used in the power supply device according to the present invention can be a nickel metal hydride battery.

In addition, the power supply device of the present invention can further comprise: charging state determining means for determining whether the rechargeable battery is in a charging state where the rechargeable battery is charged with electric charge; discharging state determining means for determining whether the rechargeable battery is in a discharging state where electric charge is discharged from the rechargeable battery to the load; and a timer for outputting time information. Based on the determination of the charging state by the charging state determining means and the determination of the discharging state by the discharging state determining means, and based on the time information output from the timer, the residual capacity detecting means calculates a charge time, which is sum of time intervals during which the charging state determining means determines that the rechargeable battery is in the charging state, and also calculates a discharge time, which is sum of time intervals during which the discharging state determining means determines that the rechargeable battery is in the discharging state. Further, based on the calculated charge time and discharge time, the residual capacity detecting means calculates the amount of charged current to the rechargeable battery, and the amount of discharged current from the rechargeable battery to the load.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawing. It is to be noted that the drawing is shown for the purpose of illustrating the technical concepts of the present invention or embodiments thereof, wherein.

DETAILED DESCRIPTION OF THE INVENTION

Figure 1:
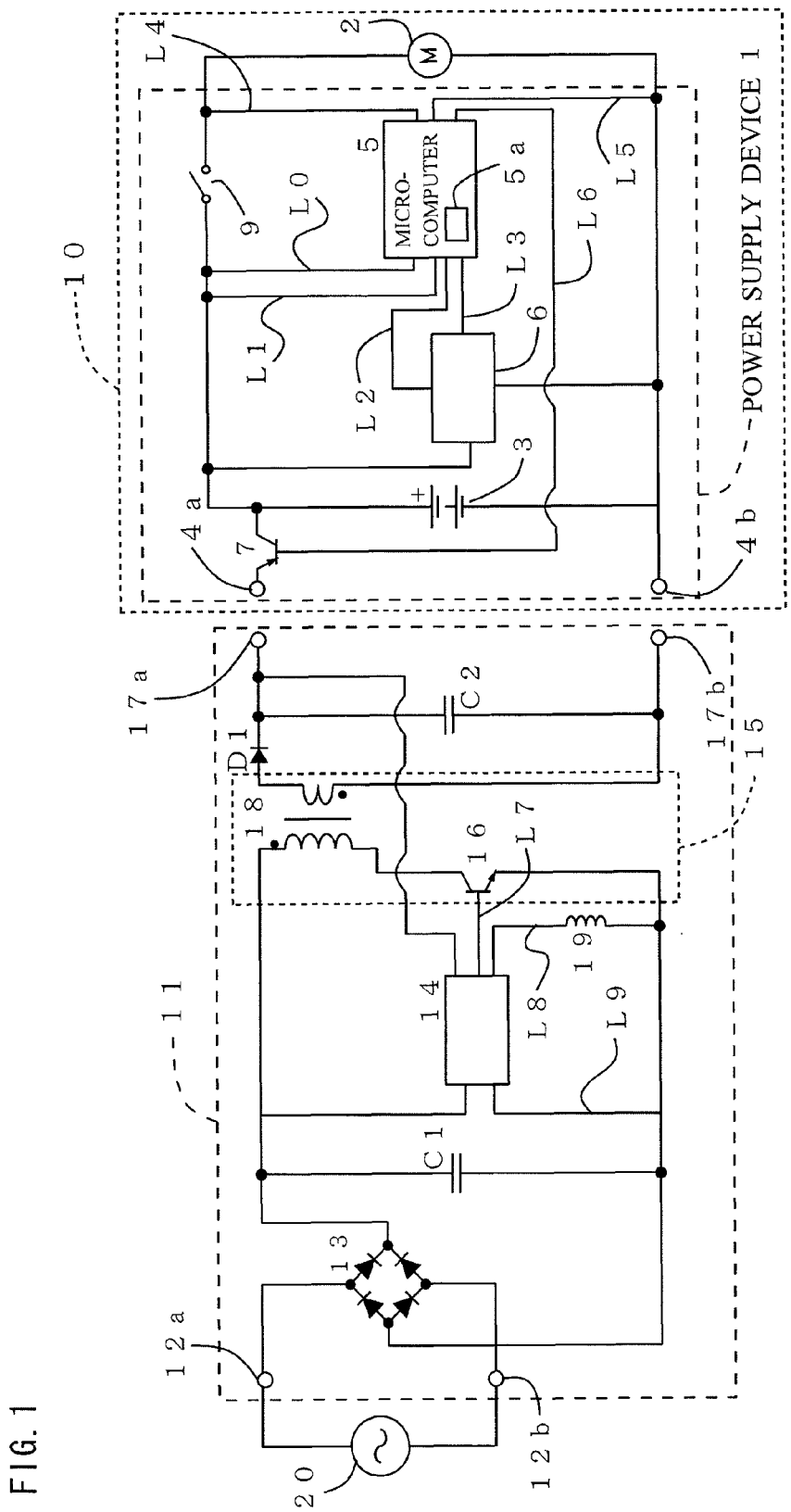
FIG. 1 is a schematic circuit diagram, partially in block form, of a shaver body including a power supply device according to an embodiment of the present invention, and an adapter to be connected to the shaver body for charging.

Embodiments of the present invention, as best mode for carrying out the invention, will be described hereinafter with reference to the drawings. The present invention relates to a power supply device. It is to be understood that the embodiments described herein are not intended as limiting, or encompassing the entire scope of, the present invention. FIG. 1 is a schematic circuit diagram, partially in block form, of a shaver body 10 (claimed "electrical device body") including a power supply device according to an embodiment of the present invention, and an adapter 11 to be connected to the shaver body 10 for charging. The power supply device 1 is used for and integrally combined with the shaver body 10 which includes a motor 2 (claimed "load").

The power supply device 1 comprises a rechargeable battery 3 for supplying power to the motor 2, and charge terminals 4a, 4b electrically connected to the rechargeable battery 3. The rechargeable battery 3 is a nickel metal hydride battery formed of a plurality of series-connected nickel metal hydride battery cells each with a normal (or steady-state) cell voltage of 1.4V. The rechargeable battery 3 has a charge characteristic (first charge characteristic) that if the charging of the rechargeable battery 3 is started with a residual capacity (or more accurately, when the rechargeable battery 3 has a residual capacity) less than a certain or predetermined threshold value, the rechargeable battery 3 reaches a state of full charge when the value of the battery voltage of the rechargeable battery 3 has become a value (approximate steady-state value of 1.4V multiplied by the number of nickel metal hydride battery cells) lower than a peak value after the value of the battery voltage passes the peak value, and a charge characteristic (second charge characteristic) that if the charging of the rechargeable battery 3 is started with a residual capacity equal to the predetermined threshold value or more, the rechargeable battery 3 reaches the state of full charge before the value of the battery voltage of the rechargeable battery 3 shows the peak value. The power supply device 1 of the present embodiment will be described, assuming that the predetermined threshold value is 90%.

The power supply device 1 comprises a microcomputer 5 supplied with power for operation from the rechargeable battery 3 to control of the entire shaver body 10 including the power supply device 1, and a switching element 6 for switching between connection and disconnection of a power supply path from the rechargeable battery 3 to the microcomputer 5. The switching element 6 comprises e.g. a transistor such as an FET (field effect transistor) and is provided between the rechargeable battery 3 and the microcomputer 5. The microcomputer 5 corresponds to the claimed "residual capacity detecting means", "battery voltage detecting means", "charge control means", "power supply stop control means", "charge current detecting means", "discharge current detecting means", "charging state determining means" and "discharging state determining means". The microcomputer 5 comprises a built-in timer 5a for outputting time information, and has a plurality of input and output terminals (not shown) respectively connected to lines L0 to L6 for input to and output from the microcomputer 5.

The line L0 is an input line for detecting a value of voltage at the positive terminal of the rechargeable battery 3, while the line L5 which is a ground line (hereafter referred to as a GND line) is an input line for detecting a value of voltage at the negative terminal of the rechargeable battery 3. Based on the voltage applied to the line L0 and the voltage applied to the GND line L5, the microcomputer 5 detects a value of battery voltage of the rechargeable battery 3. On the other hand, the line L1 is an input line for detecting a value of charge current to the rechargeable battery 3. The microcomputer 5 allows an input current to the line L1 to flow through an internal resistor provided inside the microcomputer 5, and measures a voltage drop value due to the internal resistor, and further uses the voltage drop value to detect (determine) a value of charge current to the rechargeable battery 3. Note that it is also possible to provide outside the microcomputer 5 an external resistor corresponding to the internal resistor provided inside the microcomputer 5 so as to allow the microcomputer 5 to measure a voltage drop value across the external resistor and use the voltage drop value to detect (determine) a charge current to the rechargeable battery 3.

The line L2 is an output line for a control signal for controlling the switching element 6. The switching element 6 is turned on (on-state) and off (off-state) according to a voltage level of the control signal input from the microcomputer 5 through the line L2 so as to switch between connection and disconnection of the power supply path from the rechargeable battery 3 to the microcomputer 5. The line L3 is an input line to connect the switching element 6 to the microcomputer 5 for supplying power, and used when supplying power from the rechargeable battery 3 to the microcomputer through the switching element 6. Further, the line L4 is an input line for detecting a value of discharge current discharged from the rechargeable battery 3 to the motor 2.

The microcomputer 5 calculates an amount (sum amount) of charged current to the rechargeable battery 3 and an amount (sum amount) of discharged current from the rechargeable battery 3 to the motor 2, using one of the following methods of calculation. According to one method of calculation, the microcomputer 5 allows the input current to the line L4 to flow through an internal resistor provided inside the microcomputer 5, and measures a voltage drop value due to the internal resistor, and further uses the voltage drop value to detect (determine) a value of discharge current to the motor 2. Note that it is also possible to provide outside the microcomputer 5 an external resistor corresponding to the internal resistor provided inside the microcomputer 5 so as to allow the microcomputer 5 to measure a voltage drop value across the external resistor and use the voltage drop value to detect (determine) a discharge current to the motor 2. The line L6 is an output line for a control signal for controlling switching between connection and disconnection of a power supply path from the charge terminal 4a to the positive terminal of the rechargeable battery 3. The microcomputer 5 uses the value of the charge current detected using the line L1 to calculate an amount of charged current to the rechargeable battery 3, and uses the value of the discharge current detected using the line L4 to calculate an amount of discharged current from the rechargeable battery 3 to the motor 2.

According to another method of calculation, the microcomputer 5 calculates a charge time and a discharge time, and uses the calculated charge time and discharge time to calculate an amount of charged current to the rechargeable battery 3, and an amount of discharged current from the rechargeable battery 3 to the motor 2, respectively. According to this method of calculation, first, the microcomputer 5 allows the input current to the line L1 to flow through the internal resistor provided inside the microcomputer 5 to detect whether there is a voltage drop across the internal resistor so as to determine whether the rechargeable battery 3 is in a charging state where the rechargeable battery 3 is charged with electric charge. The microcomputer 5 determines that the rechargeable battery 3 is in the charging state if it detects a voltage drop. Based on time information output from the built-in timer 5a, the microcomputer 5 calculates a charge time, which is sum of time intervals during which the microcomputer 5 determines that the rechargeable battery 5 is in the charging state.

Second, the microcomputer 5 allows the input current to the line L4 to flow through the internal resistor provided inside the microcomputer 5 to detect whether there is a voltage drop across the internal resistor. Thus, the microcomputer 5 determines whether the rechargeable battery 3 is in a discharging state where electric charge is discharged from the rechargeable battery 3 to the motor 2. The microcomputer 5 determines that the rechargeable battery 3 is in the discharging state if it detects a voltage drop. Based on time information output from the built-in timer 5a, the microcomputer 5 calculates a discharge time, which is sum of time intervals during which the microcomputer 5 determines that the rechargeable battery 5 is in the discharging state. Furthermore, based on the calculated charge time and discharge time, the microcomputer 5 calculates the amount of charged current to the rechargeable battery 3, and the amount of discharged current from the rechargeable battery 3 to the motor 2, respectively.

Based on the amount of charged current to the rechargeable battery 3 and the amount of discharged current to the motor 2, that are obtained by either of the methods of calculation described above, the microcomputer 5 detects (calculates) a residual capacity of the rechargeable battery 3. The microcomputer 5 stops (ends) charging the rechargeable battery 3 when the microcomputer 5 determines that the residual capacity of the rechargeable battery 3 detected thereby has become or reached 100% (a state of full charge), and when the microcomputer 5 determines that the value of the battery voltage of the rechargeable battery 3 detected based on the voltage applied to the line L0 and the GND line L5 has become lower than a peak value after the value of the battery voltage passes the peak value. Further, when the microcomputer 5 determines that the residual capacity of the rechargeable battery 3 detected thereby becomes less than 90% (predetermined threshold value), the microcomputer 5 controls to turn off the switching element 6 to disconnect the power supply path, and thereby stop power supply, from the rechargeable battery 3 to the microcomputer 5.

The power supply device 1 comprises a transistor 7 for switching between connection and disconnection of the power supply path from the charge terminal 4a to the positive terminal of the rechargeable battery 3. The transistor 7 is a bipolar transistor of PNP type, and switches between connection and disconnection of the power supply path from the charge terminal 4a to the positive terminal of the rechargeable battery 3 according to high and low voltage levels of the control signal input from the microcomputer 5 to the base of the transistor 7 through the line L6. More specifically, when the voltage level of the control signal input to the base of the transistor 7 is low, the emitter-collector path of the transistor 7 is rendered conductive to connect the power supply path from the charge terminal 4a to the positive terminal of the rechargeable battery 3 so as to charge the rechargeable battery 3.

On the other hand, when the voltage level of the control signal input to the base of the transistor 7 is high, the emitter-collector path of the transistor 7 is rendered non-conductive to disconnect the power supply path from the charge terminal 4a to the positive terminal of the rechargeable battery 3 so as to prevent charging the rechargeable battery 3. The power supply device 1 further comprises an operation switch 9. When the operation switch 9 is turned on to short-circuit the power supply by a user to use the shaver body 10, the rechargeable battery 3 is electrically connected to the motor 2 to allow the rechargeable battery 3 to supply power to the motor 2 so as to drive the motor 2.

Next, the adapter 11 will be described. The adapter 11 is a switching power supply unit to convert AC power (voltage) from a commercial power source 20 to DC power (voltage) so as to supply power to the shaver body 10. The adapter 11 comprises connection terminals 12a, 12b for connection to the commercial power source 20 and power supply terminals 17a, 17b for connection (and power supply) to the shaver body 10. When the rechargeable battery 3 is charged, the connection terminals 12a, 12b of the adapter 11 are connected to the commercial power source 20, and the power supply terminals 17a, 17b of the adapter 11 are connected to the shaver body 10 to provide the shaver body 10 with DC power based on the AC power supplied from the commercial power source 20.

The adapter 11 comprises a diode bridge 13 to convert AC voltage input from the commercial power source 20 to DC ripple voltage, and a smoothing capacitor C1 to smooth the DC ripple voltage output from the diode bridge 13 and convert it to a substantially constant DC voltage. The adapter 11 further comprises a control circuit 14 for controlling the entire adapter 11, and a buck converter circuit 15 to reduce the DC voltage supplied by the smoothing capacitor C1. The control circuit 14 is operated based on the DC voltage power supplied by the diode bridge 13 and the smoothing capacitor C1. The buck converter circuit 15 comprises a transformer 18 to reduce voltage and a transistor 16 for switching between a voltage applied state and a voltage non-applied state of voltage to a primary winding of the transformer 18.

The transistor 16 is a bipolar transistor of NPN type. The control circuit 14 switches between conduction (ON) and non-conduction (OFF) of the collector-emitter path of the transistor 16 by switching between high and low voltage levels of a control signal applied to the base of the transistor 16 through an output line L7, so as to switch between the voltage applied state and the voltage non-applied state of voltage to the primary winding of the transformer 18. Further, the control circuit 14 controls a ratio of a high level period to a low level period of the voltage applied to the base of the transistor 16 so as to control a ratio (so-called duty cycle) of a conduction (ON) period and a non-conduction (OFF) period of the collector-emitter path. Thereby, the control circuit 14 controls the voltage of power output from a secondary winding of the transformer 18 to be substantially constant.

The adapter 11 further comprises a transformer 19 for detecting a voltage level induced in the secondary winding of the transformer 18. The control circuit 14 detects a value of voltage induced in the transformer 19 through an input line L8 and a GND line L9 so as to feedback-control the duty cycle of the voltage applied to the base of the transistor 16 based on the detected value of the voltage of the transformer 19. The adapter 11 still further comprises a diode D1 to prevent backflow of current from the secondary winding of the transformer 18, and a smoothing capacitor C2 for smoothing voltage of power output from the diode D1.

Figure 2:
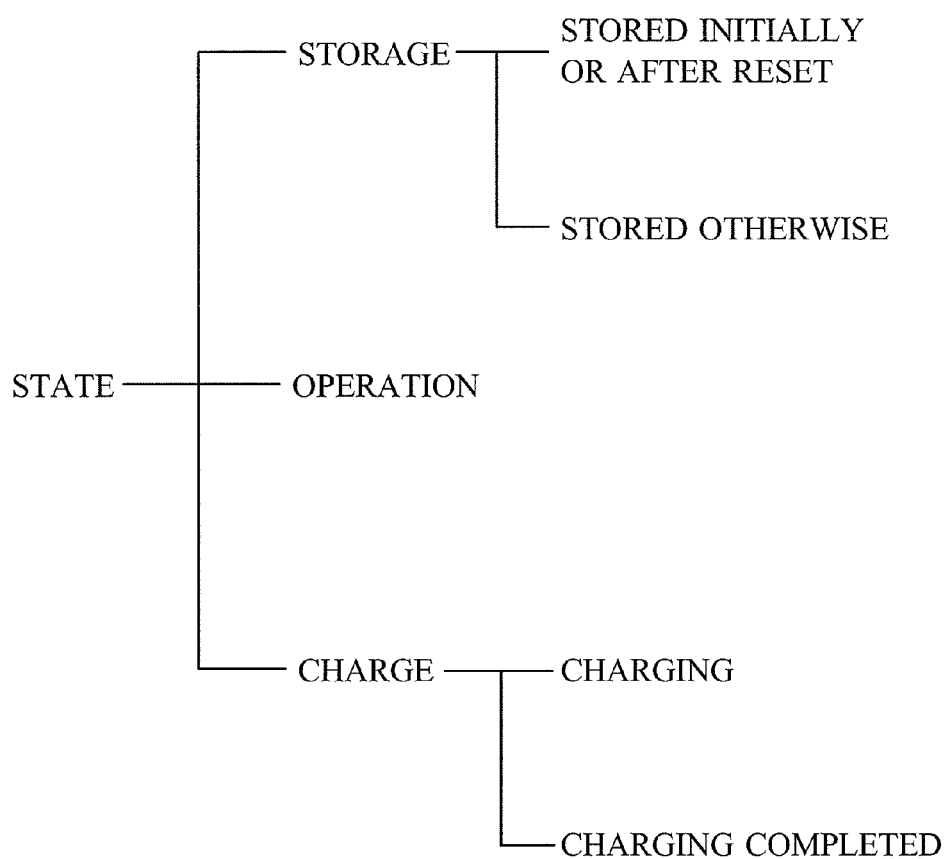
FIG. 2 is a classification diagram of state of the shaver body.

Referring now to FIG. 2, which is a classification diagram of state of the shaver body 10, the classification of its state will be described. As shown in FIG. 2, the state of the shaver body 10 is broadly classified into three: "storage" (left unused), "operation" and "charge". Here, "storage" means the state in which the operation switch 9 of the shaver body 10 is turned off, and the adapter 11 is disconnected from the shaver body 10, while "operation" means the state in which the operation switch 9 of the shaver body 10 is turned on, and the adapter 11 is disconnected from the shaver body 10. On the other hand, "charge" means the state in which the adapter 11 is (the power supply terminals 17a, 17b thereof are) connected to the shaver body 10 (the charge terminals 4a, 4b thereof), and the adapter 11 is (the connection terminals 12a, 12b thereof are) connected to the commercial power source 20. As shown in FIG. 2, the state of "storage" is further classified into "stored initially or after reset" and "stored otherwise". Here, "stored initially or after reset" includes the state of "storage" before the shaver body 10 is first used after shipment, and the state of "storage" after the microcomputer 5 is reset. Note that once the switching element 6 is turned off to disconnect the power supply path from the rechargeable battery 3 to the microcomputer 5, the shaver body 10 is returned to the state of "stored initially or after reset".

Figure 3A:
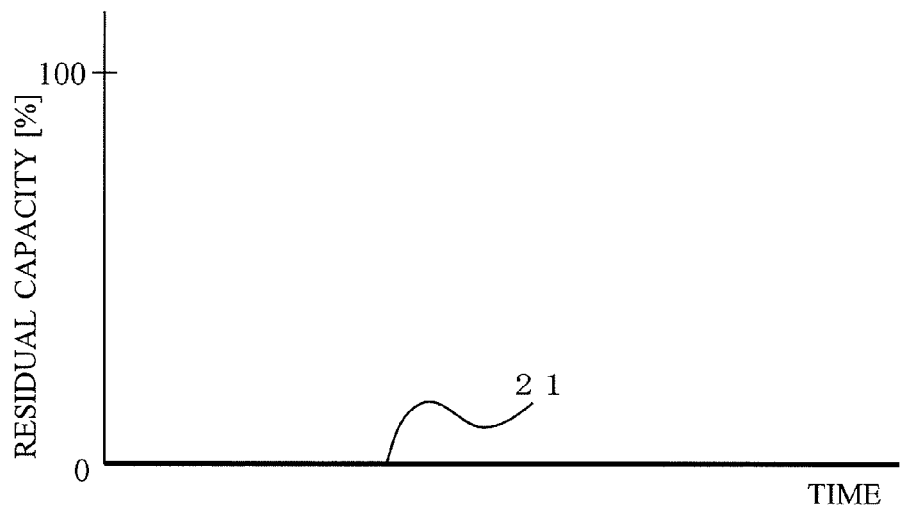
FIG. 3A is a graph showing change with time of a residual capacity of a rechargeable battery in the state of the shaver body of "stored initially or after reset" in FIG. 2.
Figure 3B:
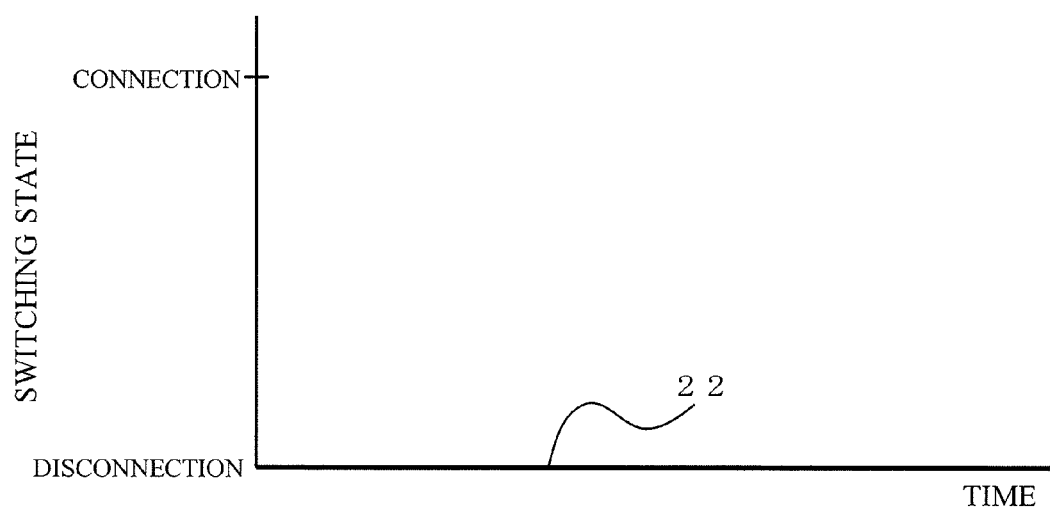
FIG. 3B is a graph showing change with time of the switching state, either connection or disconnection, of the power supply path from the rechargeable battery to a microcomputer in the state of "stored initially or after reset" in FIG. 2.

FIG. 3A is a graph (curve 21) showing change with time of the residual capacity of the rechargeable battery 3 detected by the microcomputer 5 in the state of the shaver body 10 of "stored initially or after reset" in FIG. 2, while FIG. 3B is a graph (curve 22) showing change with time of the switching state, either connection or disconnection, of the power supply path from the rechargeable battery 3 to the microcomputer 5 in the state of "stored initially or after reset". As shown by the curve 22 (bold line) in FIG. 3B, in the state of the shaver body 10 of "stored initially or after reset", the state of disconnection of the power supply path from the rechargeable battery 3 to the microcomputer 5 is maintained, so that the microcomputer 5 remains in an inoperative (inactive) state, making it impossible for the microcomputer 5 to detect the residual capacity of the rechargeable battery 3. Thus, as shown by the curve 21 (bold line) in FIG. 3A, the residual capacity stored in (recognized by) the microcomputer 5 remains at the initial value of 0%, regardless of the actual residual capacity of the rechargeable battery 3.

Figure 4:
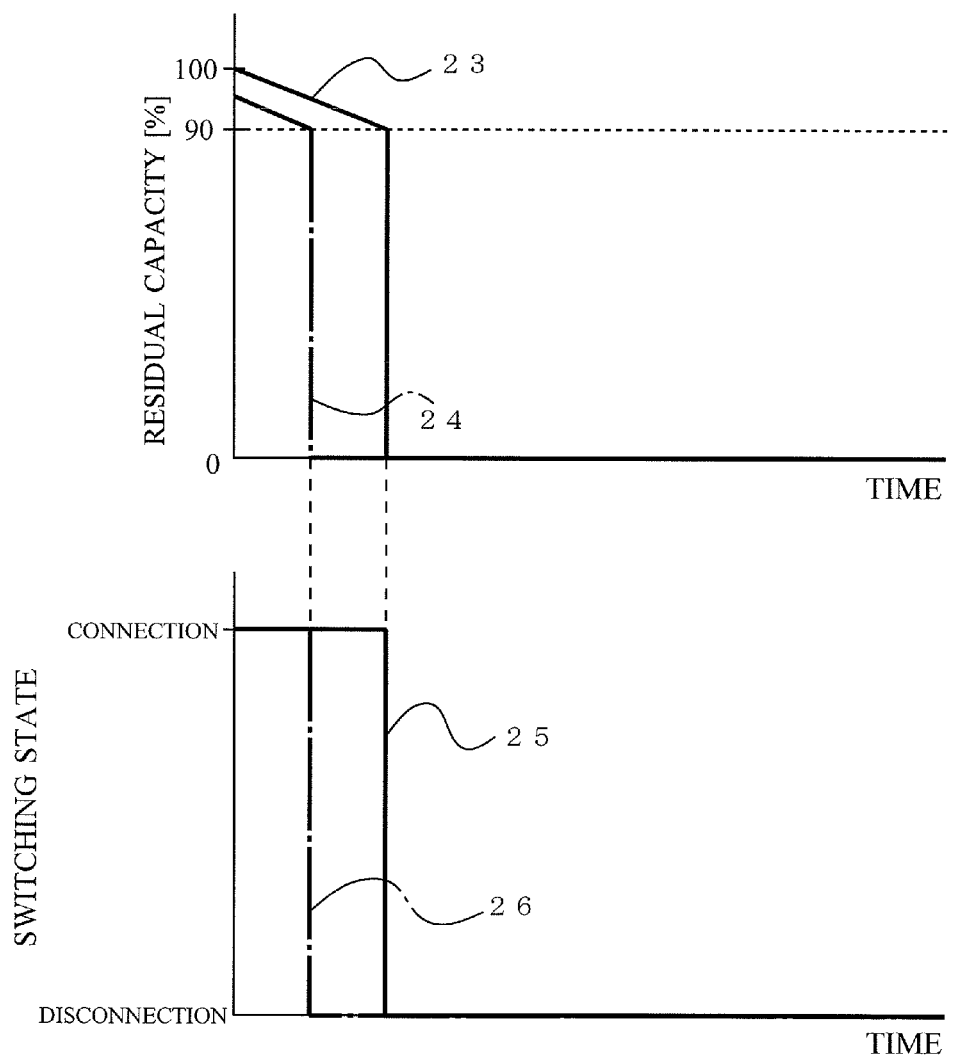
FIG. 4 is graphs in the state of the shaver body of "stored otherwise" in FIG. 2, in which the upper graph shows change with time of the residual capacity of the rechargeable battery in the state of "stored otherwise", while the lower graph shows change with time of the switching state, either connection or disconnection, of the power supply path from the rechargeable battery to the microcomputer in the state of "stored otherwise"

FIG. 4 is graphs in the state of the shaver body 10 of "stored otherwise" in FIG. 2, in which the upper graph shows change with time of the residual capacity of the rechargeable battery 3 detected by the microcomputer 5 in the state of "stored otherwise", while the lower graph shows change with time of the switching state, either connection or disconnection, of the power supply path from the rechargeable battery 3 to the microcomputer 5 in the state of "stored otherwise". Here, "stored otherwise" means the state in which the operation switch 9 of the shaver body 10 is turned off, and the adapter 11 is disconnected from the shaver body 10, while the shaver body 10 remains in the state of "storage" (left unused) other than the state of "stored initially or after reset". The upper and lower graphs of FIG. 4 show curve 23 and curve 25 (both bold solid lines), respectively, as obtained when the storage of the rechargeable battery 3 (left unused) is started with a residual capacity of 100%. On the other hand, curve 24 and curve 26 (both bold single dot-dashed lines) shown in the upper and lower graphs of FIG. 4, respectively, are those obtained when the storage of the rechargeable battery 3 (left unused) is started with a residual capacity of at least 90% (and less than 100%).

As shown by the curves 25, 26 in the lower graph of FIG. 4, when the residual capacity of the rechargeable battery 3 is between 100% and 90%, the power supply path from the rechargeable battery 3 remains connected to the microcomputer 5, so that the microcomputer 5 stores (recognizes) the residual capacity of the rechargeable battery 3. While the microcomputer 5 is in an operative (active) state, the microcomputer 5 subtracts, from the then stored (recognized) residual capacity, a capacity (battery capacity) of the rechargeable battery 3 corresponding to that consumed by the circuit of the power supply device 1 (consumed mainly by the microcomputer 5) per unit time (for example one second) continuously. Thus, as shown by the curves 23, 24 in the upper graph of FIG. 4, the residual capacity of the rechargeable battery 3 detected (calculated) by the microcomputer 5 decreases in proportion to time when the residual capacity of the rechargeable battery 3 is between 100% and 90%.

On the other hand, as shown by the curves 25, 26 in the lower graph of FIG. 4, when the residual capacity of the rechargeable battery 3 becomes less than 90%, the switching element 6 is turned off (off-state) to disconnect the power supply path from the rechargeable battery 3 to the microcomputer 5. Thus, the microcomputer 5 is changed to the inoperative state so as to become unable to detect the residual capacity of the rechargeable battery 3. In the inoperative state, as shown by the curves 23, 24 in the upper graph of FIG. 4, the residual capacity stored in (recognized by) the microcomputer 5 is reset, and remains at the initial value of 0%, regardless of the actual residual capacity of the rechargeable battery 3.

Figure 5A:
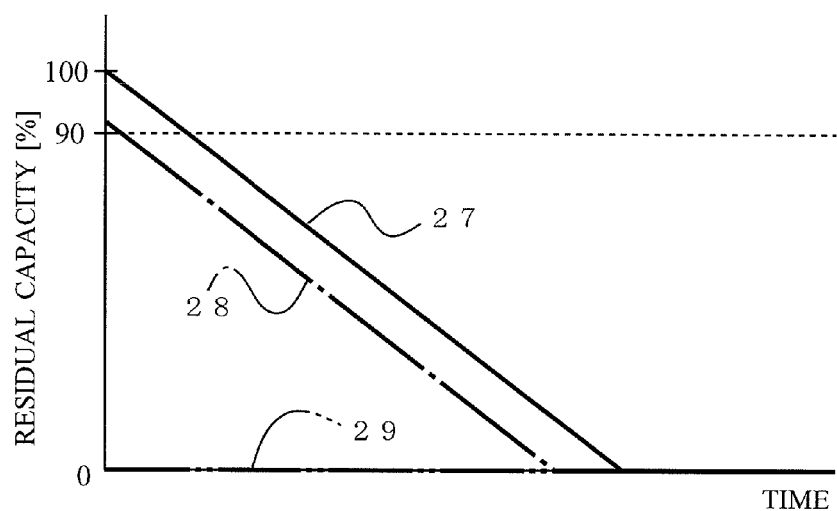
FIG. 5A is a graph showing change with time of the residual capacity of the rechargeable battery in the state of the shaver body of "operation" in FIG. 2.
Figure 5B:
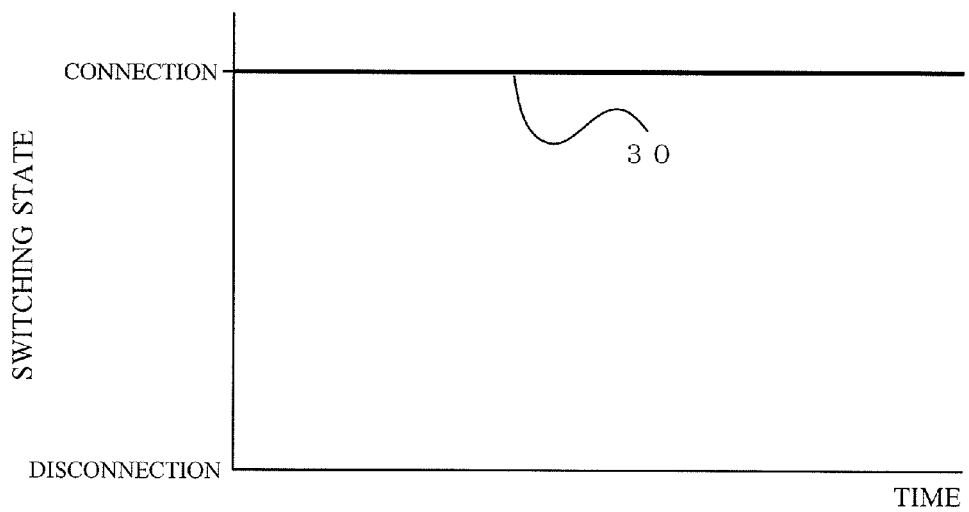
FIG. 5B is a graph showing change with time of the switching state, either connection or disconnection, of the power supply path from the rechargeable battery to the microcomputer in the state of "operation" in FIG. 2.

FIG. 5A is a graph showing change with time of the residual capacity of the rechargeable battery 3 detected by the microcomputer 5 in the state of the shaver body 10 of "operation" in FIG. 2, while FIG. 5B is a graph showing change with time of the switching state, either connection or disconnection, of the power supply path from the rechargeable battery 3 to the microcomputer 5 in the state of "operation". FIG. 5A shows curve 27 (bold solid line), curve 28 (bold single dot-dashed line) and curve 29 (bold double dot-dashed line) which are obtained when the operation of the rechargeable battery 3 is started with a residual capacity of 100%, a residual capacity of at least 90% (and less than 100%), and a residual capacity less than 90%, respectively. On the other hand, FIG. 5B shows curve 30 (bold solid line) showing the change with time of the switching state of the power supply path for each of the cases when the residual capacities to start the operation of the rechargeable battery 3 with are 100%, at least 90% (and less than 100%), and less than 90%.

As shown by the curve 30 in FIG. 5B, when the shaver body 10 with the rechargeable battery 3 is in the state of "operation", the switching element 6 remains in the on-state regardless of the residual capacity of the rechargeable battery 3, so that the microcomputer 5 remains in the operative state. Thus, the microcomputer 5 continues to detect the residual capacity when a user turns on the operation switch 9 to start the operation of the motor 2 of the shaver 10 with a residual capacity of the rechargeable battery 3 of at least 90% (i.e. when the microcomputer 5 stores (recognizes) the residual capacity of the rechargeable battery 3) as shown by the curves 27, 28. More specifically, the microcomputer 5 calculates the residual capacity of the rechargeable battery 3 by subtracting, from the then stored (recognized) residual capacity, a capacity (battery capacity) of the rechargeable battery 3 corresponding to the sum of the amount of discharged current from the rechargeable battery 3 to the motor 2 (i.e. the amount of current consumed to operate the motor 2) and the amount of current consumed by the microcomputer 5.

Here, the microcomputer 5 controls the calculation of the residual capacity described above in such a way that the calculated residual capacity does not become less than 0%. More specifically, if the calculated residual capacity is less than 0%, the microcomputer 5 allows the residual capacity to remain 0%. In order to calculate the residual capacity in this way, each of the curves 27, 28, which correspond to the calculated residual capacities, has a shape of two straight lines as shown in FIG. 5A. The microcomputer 5 can calculate the amount of discharged current described above, either by sequentially summing values of discharge current calculated based on the input current to the line L4, or by multiplying an estimated (calculated) value of discharge current per unit time by a discharge time calculated based on the determination of the discharging state and time information as described above.

On the other hand, when the user turns on the operation switch 9 to start the operation of the motor 2 with a residual capacity of the rechargeable battery 3 of less than 90% (i.e. when the microcomputer 5 does not recognize the residual capacity), the residual capacity stored in (recognized by) the microcomputer 5 at the start of the operation is the initial value of 0%. As described above, when the microcomputer 5 calculates the residual capacity of the rechargeable battery 3 by subtracting the amount of discharged current and so on from the then stored residual capacity, while the microcomputer 5 allows the residual capacity to remain 0% if the calculated residual capacity is less than 0%. Thus, as shown by the curve 29 in FIG. 5A, when the operation of the motor 2 (rechargeable battery 3) is started with a residual capacity less than 90%, the microcomputer 5 allows the residual capacity stored therein (recognized thereby) to remain 0% from the start to the end of the operation.

Note that the curves 27, 28 shown in FIG. 5A are those showing change of the residual capacity when the state of "operation" continues until the residual capacity becomes 0%. However, if the operation of the rechargeable battery 3 is once stopped before the residual capacity becomes 0%, the state of FIG. 5A (state of "operation") is changed to the state of "stored otherwise" as shown in FIG. 4. Thus, when the operation of the rechargeable battery 3 is stopped to change the state of the shaver body 10 to the state of "stored otherwise" while the residual capacity is less than 90%, the switching element 6 is turned off to disconnect the power supply path from the rechargeable battery 3 to the microcomputer 5 as shown by the curves 25, 26 in the lower graph of FIG. 4. Thus, as shown by the curves 23, 24 in the upper graph of FIG. 4, the residual capacity stored in (recognized by) the microcomputer 5 is reset, and remains at the initial value of 0% regardless of the actual residual capacity of the rechargeable battery 3.

Figure 6A:
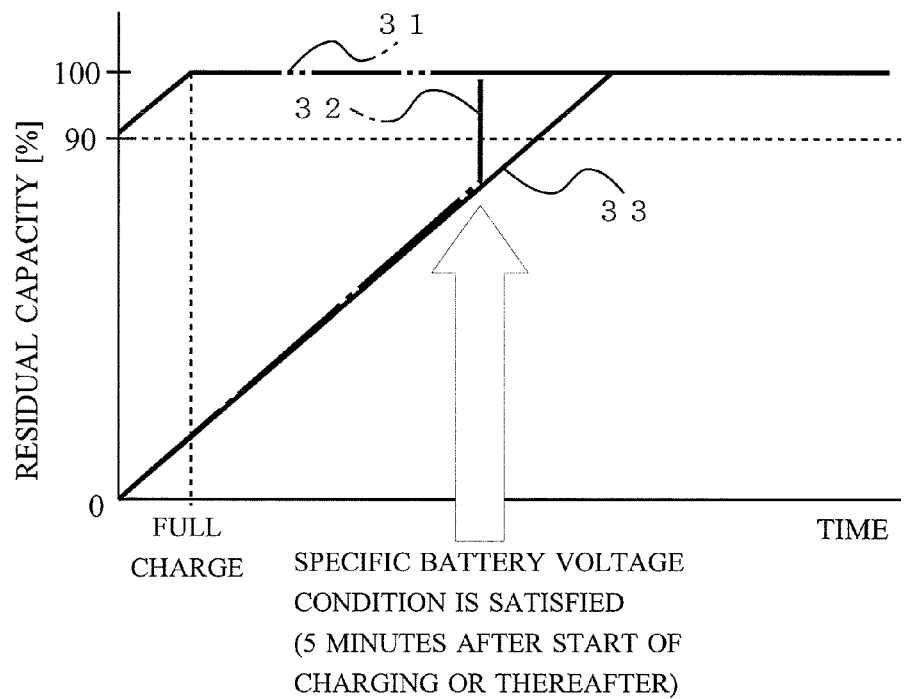
FIG. 6A is a graph showing change with time of the residual capacity of the rechargeable battery in the state of the shaver body of "charging" in FIG. 2.
Figure 6B:
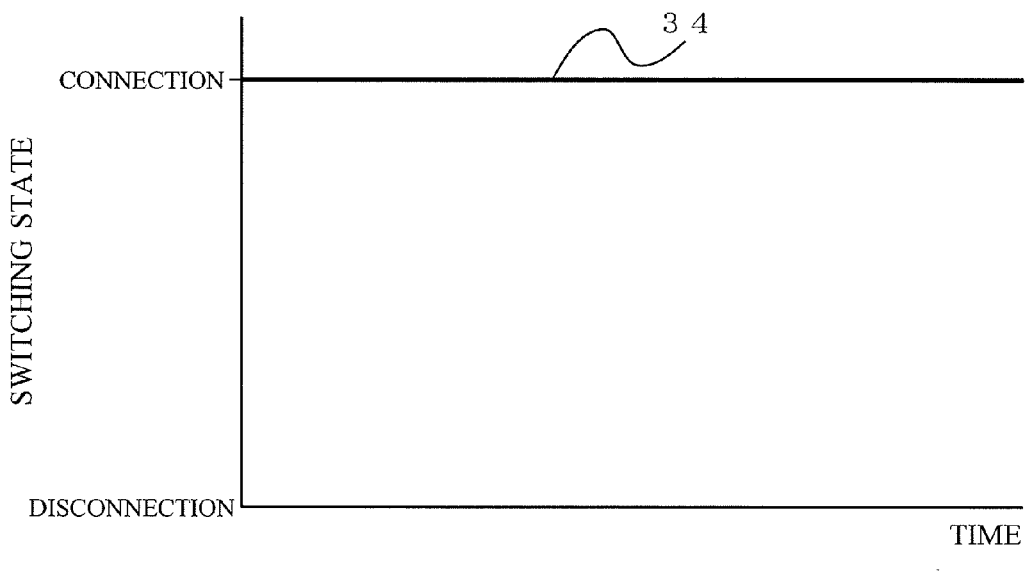
FIG. 6B is a graph showing change with time of the switching state, either connection or disconnection, of the power supply path from the rechargeable battery to the microcomputer in the state of "charging" in FIG. 2.

Referring back to FIG. 2, the state of "charge" is further classified into "charging" and "charging completed". Here, "charging" means the state in which the shaver body 10 (the rechargeable battery 3 of the shaver body 10) is being charged, while "charging completed" means the state in which the charging of the rechargeable battery 3 is completed. FIG. 6A is a graph showing change with time of the residual capacity of the rechargeable battery 3 detected by the microcomputer 5 in the state of the shaver body 10 of "charging" in FIG. 2, while FIG. 6B is a graph showing change with time of the switching state, either connection or disconnection, of the power supply path from the rechargeable battery 3 to the microcomputer 5 in the state of "charging". FIG. 6A shows curve 31 (bold double dot-dashed line) which is obtained when the charging of the rechargeable battery 3 is started with a residual capacity of at least 90%. FIG. 6A also shows curve 32 (bold single dot-dashed line) and curve 33 (bold solid line) each of which is obtained when the charging is started with a residual capacity of 0%.

The curve 32 is obtained when a specific battery voltage condition described later is satisfied 5 minutes after the start of the charging or thereafter and before the residual capacity detected (calculated) by the microcomputer 5 becomes 100%. On the other hand, the curve 33 is obtained when the specific battery voltage condition is not satisfied before the residual capacity detected (calculated) by the microcomputer 5 becomes 100%. On the other hand, FIG. 6B shows curve 34 (bold solid line) showing the change with time of the switching state of the power supply path for each of the cases when the residual capacities to start charging the rechargeable battery 3 with are at least 90% (less than 100%) and 0%.

As shown by the curve 34 in FIG. 6B, when the shaver body 10 is in the state of "charging", the switching element 6 remains in the on-state regardless of the residual capacity of the rechargeable battery 3, so that the microcomputer 5 remains in the operative state. Thus, the microcomputer 5 continues to detect the residual capacity when the user connects the adapter 11 to the shaver body 10 to start charging the rechargeable battery 3 with a residual capacity of the rechargeable battery 3 of at least 90% (i.e. when the microcomputer 5 stores (recognizes) the residual capacity of the rechargeable battery 3) as shown by the curve 31. More specifically, for example, the microcomputer 5 calculates the amount of charged current to the rechargeable battery 3 by sequentially summing values of charge current calculated based on the input current to the line L1, and adds the calculated amount of charged current to the then stored residual capacity to calculate the residual capacity of the rechargeable battery 3. Note that, alternatively, the microcomputer 5 can calculate the amount of charged current by multiplying an estimated (calculated) value of charge current per unit time by a charge time calculated based on the determination of the charging state and time information described above.

Here, the specific battery voltage condition described above is defined to mean that the value of the battery voltage of the rechargeable battery 3 becomes a value (approximate steady-state value) lower than a peak value after the value of the battery voltage passes (more specifically, reaches and passes) the peak value. As shown by the curve 32 in FIG. 6A, the residual capacity of the rechargeable battery 3 formed of a plurality of series-connected nickel metal hydride battery cells normally reaches a state of full charge (100%) when the specific battery voltage condition described above is satisfied, if the charging of the rechargeable battery 3 is started with a residual capacity less than a certain or predetermined threshold value (90%). Thus, the microcomputer 5 is designed so that when the specific battery voltage condition is satisfied at a predetermined time (for example 5 minutes) after starting charging the rechargeable battery 3 or thereafter, the microcomputer 5 changes the then stored (recognized) value of the residual capacity to 100% regardless of the stored (recognized) value of the residual capacity, and stops (ends) charging the rechargeable battery 3.

However, the microcomputer 5 is also designed not to change the value of the residual capacity to 100% until the above-described predetermined time elapses after starting charging the rechargeable battery 3, even if the specific battery voltage condition is satisfied. This is because when the nickel metal hydride battery cells forming the rechargeable battery 3 are in an inactive state, the battery voltage of the rechargeable battery 3 often shows a peak value different from an intrinsic peak value corresponding to the state of full charge within the above-described predetermined time (for example 5 minutes) after starting charging the rechargeable battery 3. Thus, the microcomputer 5 does not change the value of the residual capacity to 100% until the predetermined time elapses after starting charging the rechargeable battery 3, even if the specific battery voltage condition is satisfied, so as to be prevented from erroneously detecting that the rechargeable battery 3 has reached the state of full charge when the battery voltage passes a peak value different from the intrinsic peak value.

Normally, when the charging of the rechargeable battery 3 is started with a residual capacity (stored in or recognized by the microcomputer 5) less than 90%, the specific battery voltage condition is satisfied before the residual capacity of the rechargeable battery 3 becomes 100%, so that the residual capacity of the rechargeable battery 3 shows change with time as shown by the curve 32 in FIG. 6A. On the other hand, the nickel metal hydride battery cells of the rechargeable battery 3 have a charge characteristic (second charge characteristic described above) that when the charging of the rechargeable battery 3 is started with a residual capacity of at least 90%, the battery cells (rechargeable battery 3) reach the state of full charge before the battery voltage shows the peak value. Thus, when the charging of the rechargeable battery 3 is started with a residual capacity of at least 90%, the microcomputer 5 stops charging the rechargeable battery 3 when the microcomputer 5 determines that the residual capacity of the rechargeable battery 3 detected thereby has become or reached 100% (state of full charge), so that the residual capacity of the rechargeable battery 3 shows change with time as shown by the curve 31 in FIG. 6A.

Figure 7A:
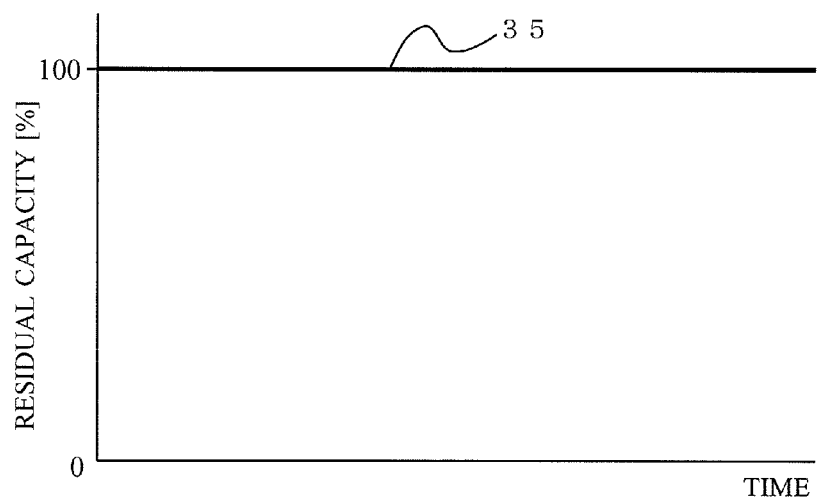
FIG. 7A is a graph showing change with time of the residual capacity of the rechargeable battery in the state of the shaver body of "charging completed" in FIG. 2.
Figure 7B:
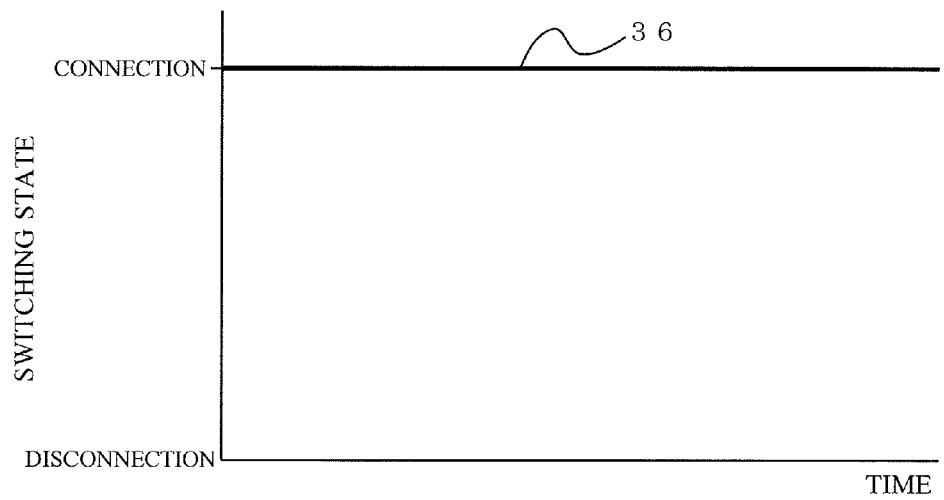
FIG. 7B is a graph showing change with time of the switching state, either connection or disconnection, of the power supply path from the rechargeable battery to the microcomputer in the state of "charging completed" in FIG. 2.
Figure 8:
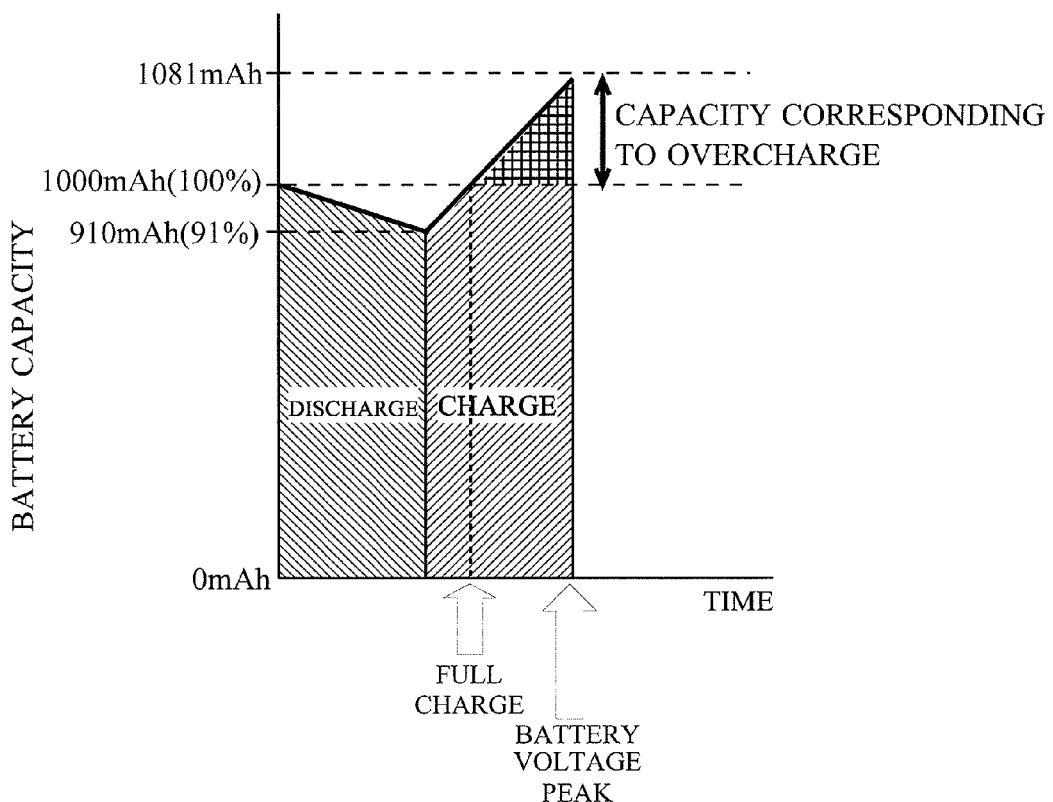
FIG. 8 is a graph showing variation with time of battery capacity in a conventional power supply device without a residual capacity detection function, for explaining the problem of overcharging.
Figure 9:
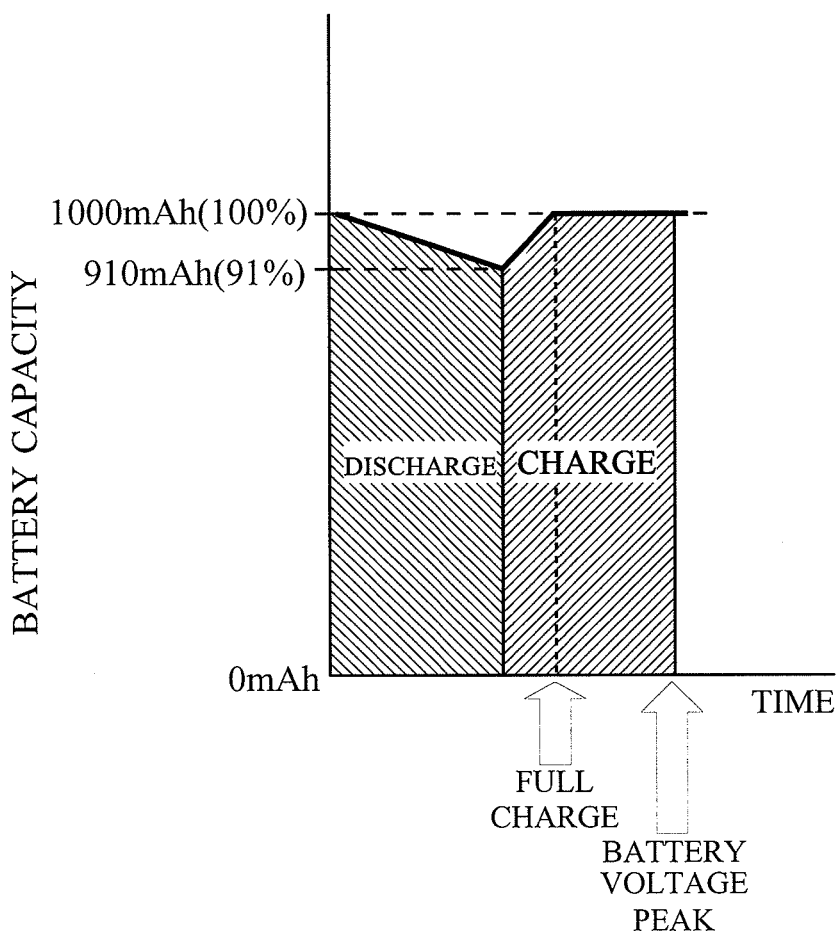
FIG. 9 is a graph showing variation with time of battery capacity in a conventional power supply device with a residual capacity detection function, for explaining how it prevents overcharging.

FIG. 7A is a graph showing change with time of the residual capacity of the rechargeable battery 3 detected by the microcomputer 5 in the state of the shaver body 10 of "charging completed" in FIG. 2, while FIG. 7B is a graph showing change with time of the switching state, either connection or disconnection, of the power supply path from the rechargeable battery 3 to the microcomputer 5 in the state of "charging completed". As shown by curve 36 in FIG. 7B, when the shaver body 10 is in the state of "charging completed", the switching element 6 remains in the on-state, so that the microcomputer 5 remains in the operative state. Further, as shown by curve 35 in FIG. 7A, the microcomputer 5 allows the residual capacity to remain 100% until the user turns on the operation switch 9 to start the operation of the motor 2.

As described above, according to the power supply device 1 of the present embodiment, when the residual capacity of the rechargeable battery 3 becomes less than 90% as shown in FIG. 4, the switching element 6 is turned off to disconnect (stop) power supply from the rechargeable battery 3 to the microcomputer 5. This makes it possible to reduce power consumption. Further, even if the power supply to the microcomputer 5 is thus disconnected (stopped) to bring the microcomputer 5 to a state where the microcomputer 5 does not store (recognize) the residual capacity, the rechargeable battery 3 reaches a state of full charge in principle when the specific battery voltage condition described above is satisfied, if the charging of the rechargeable battery 3 is started with a residual capacity less than 90% as shown by the curve 32 in FIG. 6A. When the specific battery voltage condition is satisfied at the predetermined time (for example 5 minutes) after starting charging the rechargeable battery 3 or thereafter, the microcomputer 5 changes the then stored (recognized) value of the residual capacity to 100% regardless of the stored (recognized) value of the residual capacity, and stops charging the rechargeable battery 3. Thus, overcharging of the rechargeable battery 3 can be prevented when the charging of the rechargeable battery 3 is started with a residual capacity less than 90%.

On the other hand, as shown in FIG. 4, when the residual capacity of the rechargeable battery 3 is at least 90%, the power supply from the rechargeable battery 3 to the microcomputer 5 is not disconnected (stopped) (to allow the microcomputer 5 to remain operative to detect the residual capacity). Thus, if the charging of the rechargeable battery 3 is started with a residual capacity of at least 90% as shown by the curve 31 in FIG. 6A, the microcomputer 5 stops charging the rechargeable battery 3 when the residual capacity of the rechargeable battery 3 has become 100% and before the value of the battery voltage of the rechargeable battery 3 shows a peak value. This makes it possible to prevent overcharging of the rechargeable battery 3 even when the charging of the rechargeable battery 3 is started with a residual capacity less than 90%.

It is to be noted that the present invention is not limited to the above-described embodiment, and various modifications are possible within the spirit and scope of the present invention. For example, although the embodiment described above shows an example in which the power supply device is integrally combined with the shaver body, the present invention can be applied, for example, to the case where the power supply device is integrally combined with a body of an electronic device such as a cellular phone or a portable information device. In addition, the rechargeable battery to be comprised in the power supply device of the present invention is not necessarily a nickel metal hydride rechargeable battery, as long as the rechargeable battery has the first and second charge characteristics described above. The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2011-199006 filed Sep. 13, 2011, the content of which is hereby incorporated by reference.

The invention claimed is:

1. A power supply device integrally combined with an electrical device body including a load, the power supply device comprising:
   a rechargeable battery for supplying power to the load;
   charge terminals electrically connected to the rechargeable battery;
   a residual capacity detector supplied with power from the rechargeable battery for operation to detect a residual capacity of the rechargeable battery based on an amount of charged current to the rechargeable battery and an amount of discharged current from the rechargeable battery to the load;
   a switch provided between the rechargeable battery and the residual capacity detector;
   a battery voltage detector for detecting a value of battery voltage of the rechargeable battery;
   a charge controller for stopping charging the rechargeable battery when the residual capacity detected by the residual capacity detector has become 100%, and when the value of the battery voltage detected by the battery voltage detector has become a value lower than a peak value after the value of the battery voltage passes the peak value; and a power supply stop controller for controlling to turn off the switch to stop the power supply from the rechargeable battery to the residual capacity detector when the residual capacity detected by the residual capacity detector becomes less than a predetermined threshold value, wherein the rechargeable battery has: a charge characteristic that if charging of the rechargeable battery is started when the rechargeable battery has a residual capacity less than the predetermined threshold value, the rechargeable battery reaches a state of full charge when the value of the battery voltage of the rechargeable battery has become a value lower than a peak value after the value of the battery voltage passes the peak value; and a charge characteristic that if the charging of the rechargeable battery is started when the rechargeable battery has a residual capacity equal to the predetermined threshold value or more, the rechargeable battery reaches the state of full charge before the value of the battery voltage of the rechargeable battery shows the peak value, and wherein the charge controller does not change the value of the residual capacity to 100% until a predetermined time elapses after starting charging the rechargeable battery, even if the value of the battery voltage of the rechargeable battery has become a value lower than a peak value after the value of the battery voltage passes the peak value, and changes the value of the residual capacity to 100% and stops the charging of the rechargeable battery when the value of the battery voltage of the rechargeable battery has become a value lower than a peak value after the value of the battery voltage passes the peak value and the predetermined time elapses after the starting charging the rechargeable battery or thereafter.

2. The power supply device according to claim 1, further comprising:

a charge current detector for detecting a value of the charge current to the rechargeable battery and discharge current detector for detecting a value of the discharge current discharged from the rechargeable battery to the load, wherein the residual capacity detector uses the value of the charge current detected by the charge current detector to calculate the amount of charged current to the rechargeable battery, and uses the value of the discharge current detected by the discharge current detector to calculate the amount of discharged current from the rechargeable battery to the load.

3. The power supply device according to claim 2, wherein the rechargeable battery is a nickel metal hydride battery.

4. The power supply device according to claim 1, further comprising:

a charging state detector for determining whether the rechargeable battery is in a charging state where the rechargeable battery is charged with electric charge;

a discharging state determiner for determining whether the rechargeable battery is in a discharging state where electric charge is discharged from the rechargeable battery to the load; and a timer for outputting time information, wherein based on the determination of the charging state by the charging state determiner and the determination of the discharging state by the discharging state determiner, and based on the time information output from the timer, the residual capacity detector calculates a charge time, which is sum of time intervals during which the charging state determiner determines that the rechargeable battery is in the charging state, and also calculates a discharge time, which is sum of time intervals during which the discharging state determiner determines that the rechargeable battery is in the discharging state, and wherein based on the calculated charge time and discharge time, the residual capacity detector calculates the amount of charged current to the rechargeable battery, and the amount of discharged current from the rechargeable battery to the load.

5. The power supply device according to claim 4, wherein the rechargeable battery is a nickel metal hydride battery.

6. The power supply device according to claim 1, wherein the rechargeable battery is a nickel metal hydride battery.

* * * * *